United States Patent
Mar et al.

(10) Patent No.: US 6,789,816 B2
(45) Date of Patent: Sep. 14, 2004

(54) PASSENGER AIRBAG ASSEMBLY

(75) Inventors: William Mar, Springfield Township, MI (US); Fred Daris, Clarkston, MI (US); John Rust, Rochester, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 46 days.

(21) Appl. No.: 10/310,943

(22) Filed: Dec. 6, 2002

(65) Prior Publication Data
US 2004/0108696 A1 Jun. 10, 2004

(51) Int. Cl.[7] .................................................. B60R 21/20
(52) U.S. Cl. ..................... 280/728.3; 280/732
(58) Field of Search ........................... 280/728.1, 728.2, 280/728.3, 731, 732

(56) References Cited

U.S. PATENT DOCUMENTS 6,394,485 B1    5/2002  Amamori
6,467,801 B1 *  10/2002 Preisler et al. ........... 280/728.3
6,568,705 B2 *  5/2003  Kinane .................... 280/728.3
6,601,870 B2 *  8/2003  Suzuki et al. ........... 280/728.3

FOREIGN PATENT DOCUMENTS

GB        2265338      *  9/1993  ............... 280/728.3

* cited by examiner

Primary Examiner—Eric Culbreth
(74) Attorney, Agent, or Firm—Edwin W. Bacon, Jr.

(57) ABSTRACT

A passenger airbag assembly is provided with a guide chute. The chute guides a deploying airbag to a door in the instrument panel. The door comprises steel inserts molded into the material of the door. The steel inserts include three slots spaced apart to absorb stress. To reinforce the hinges of the door, a guide or reinforcement ledge is provided at the sides. To reinforce the ledge, ramps are provided on the underside of the ledge.

3 Claims, 2 Drawing Sheets

PASSENGER AIRBAG ASSEMBLY

BACKGROUND OF THE INVENTION

This invention relates to a passenger airbag assembly with a door and a chute.

A passenger airbag assembly is known from U.S. Pat. No. 6,394,485 in which on the passenger side of a vehicle an airbag is provided within the instrument panel. In order for the airbag to deploy a door is provided in the instrument panel which provides an area for deployment of the airbag. The door operates via the deploying airbag. When the airbag is activated, the airbag expands towards the doors. The airbag then contacts the inner side of the door and supplies a force to open the door. The door is opened by the airbag pressing on the inner side which applies enough force to separate the material of the door. In order for the door to open in a desired manner seams or fracture points are provided on the door. The disadvantage of this assembly is that the airbag supplies a force to the door which may cause tears in the door and further damage the deploying airbag.

An aspect of the invention is to control the expansion of the deploying airbag and suitably strengthen the door in order to reduce tears and damage to the door.

This aspect can be achieved in that an airbag door is provided with steel inserts molded as part of the passenger airbag chute assembly which defines the passenger airbag deployment area through the instrument panel.

This chute is a molded plastic part which the passenger airbag mounts to on the top surface of the instrument panel. This chute guides a cushion of the airbag out during deployment. During operation the deploying airbag may supply a force sufficient enough to damage the doors or tear or separate the doors at mounting points at the sides. The damage or stressing of the doors at the mounting points can lead to the doors being ripped off or injury to the deploying airbag. The airbag doors can comprise two separate steel pieces with three slots spaced equally apart on each part. The steel inserts provide strength to the doors. The slots reduce additional stress or strain on the material to prevent the doors from tearing or separating at the mounting parts. The slots can absorb strain on the steel inserts which may damage the door material. The chute and door can be molded as a unit. The steel inserts would then be insert molded into the unit.

A further aspect of certain preferred embodiments of the invention is to further protect the cushion of the deploying airbag and prevent large stress or strain at the hinge or mounting points of the airbag doors.

This aspect is accomplished in certain preferred embodiments of the invention by a guide or reinforcement ledge spanning across the chute which absorbs the forces of the deploying airbag rather than the doors. The ledge is provided along the top edge of the chute and the ledge acts as a reinforcement to reduce the stress or strain on the door as the airbag is deployed up through the chute. The ledge also guides the deploying airbag. The ledge can be located at two sides of the deployment area of the airbag and between the hinge of the door and the instrument panel.

In a further embodiment, ramps are arranged on the bottom surface of the reinforcement guide. The ramps incorporated into the design of the ledge makes the ledge stronger to thereby absorb the forces generated by the deploying airbag. The ramps also help in deflecting the cushion away from the top edge of the guide which can pinch the cushion.

Other objects, advantages and novel features of the present invention will become apparent from the following detailed description of the invention when considered in conjunction with the accompanying drawings.

DETAILED DESCRIPTION OF THE DRAWINGS

Figure 1:
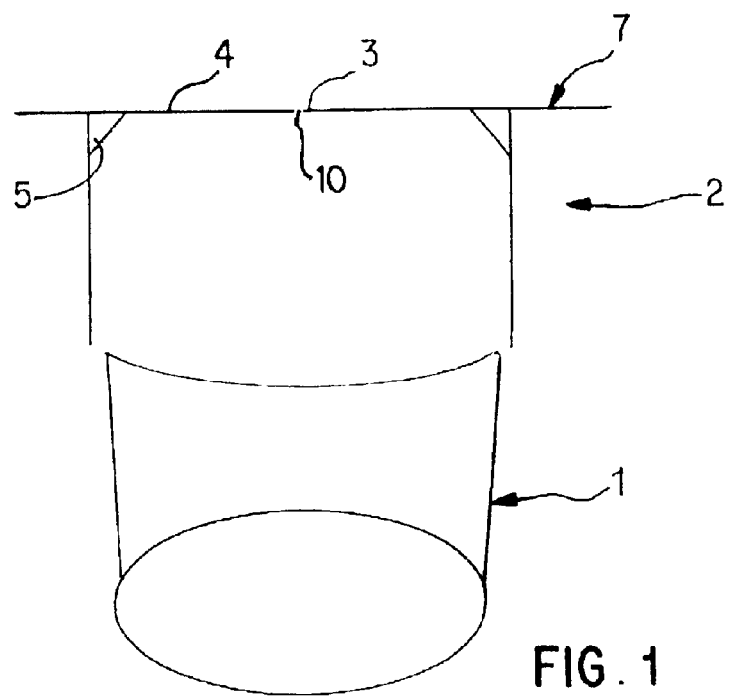
FIG. 1 shows a cross section of an airbag assembly.

FIG. 1 shows a cross-section of the passenger airbag assembly. A passenger airbag 1 is arranged below an instrument panel 7 in the interior of the vehicle. The airbag operates by deploying a cushion which expands towards the instrument panel 7 and is guided in chute 2. The deploying airbag encounters the doors 3 and forces the doors to separate and open. In order for the doors 3 to open, a predetermined breaking point 10 is provided, usually in the center of the doors 3. The predetermined breaking points 10 are accompanied by hinges 4 at each side of the doors 3. The breaking point 10 provides a seam whereby the doors separate and allow the airbag to expand into the passenger compartment of the vehicle. The hinges 4 are arranged to provide a hinge action to the doors 3 and may be weakened or suitably located to provide such an action.

Figure 2:
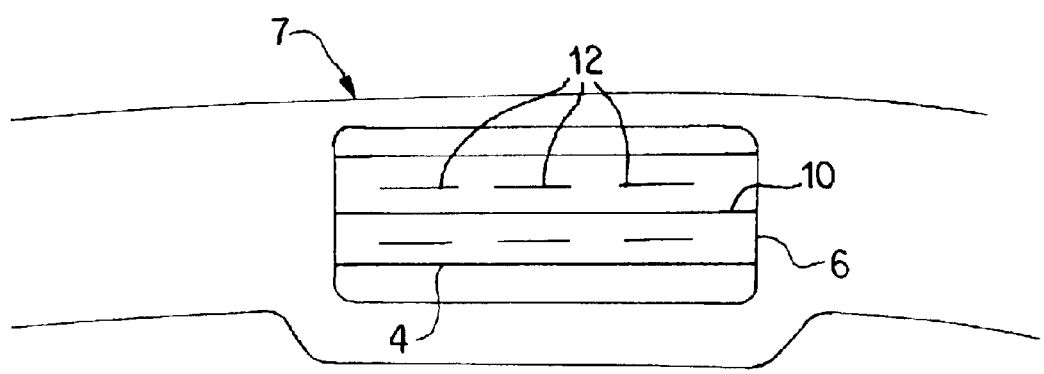
FIG. 2 shows a perspective view of a chute and door inserts positioned in a passenger vehicle instrument panel.

In order to strengthen the doors, steel inserts 11 (shown schematically in FIG. 4) are provided which run in the direction of the hinges 4 and breaking point seam. The steel inserts 11 are molded into the doors 3. The steel inserts 11 may be provided with slots 12 which absorb stress or strain when the airbag deploys. The reduction in stress or strain further protects the hinges 4 and doors 3 from damage. The slots 12 may be arranged parallel to the hinges 4 and seam 10 and parallel to each other. In FIG. 2, three slots 12 are provided along each steel insert 11.

To further reinforce the doors, a reinforcement ledge 8 is provided along the top edge of the chute 2. The reinforcement ledge 8 spans the chute 2 in the direction of the hinges 4 and provides a stronger area at the lip of the chute. The ledge 8 also positions the hinges towards the inner region of the deployment area. The reinforcement ledge 8 provides the doors with an area which can absorb the forces of the deploying airbag. The ledge may be made of steel or the like.

Figure 3:
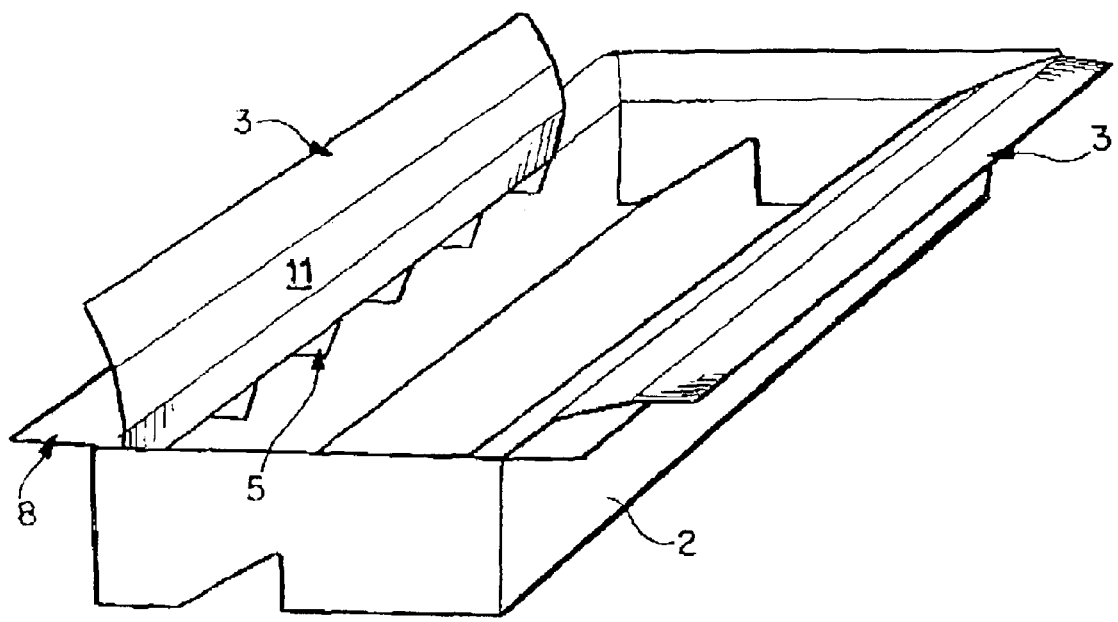
FIG. 3 shows a perspective view of the chute assembly with the doors in a deployed position.
Figure 4:
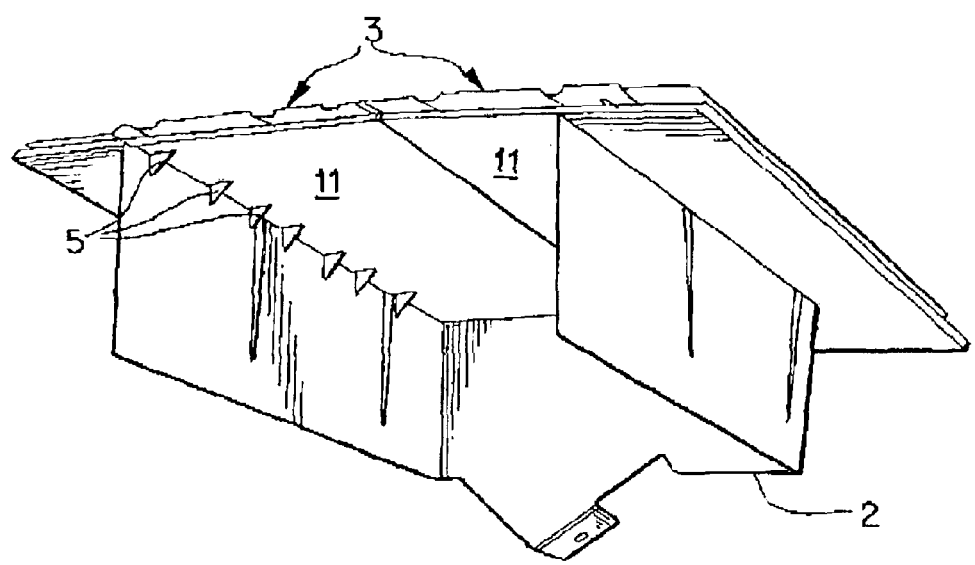
FIG. 4 shows a perspective view of the airbag assembly with the doors in a non-deployed position.

The insert molded steel doors 3 as shown in FIG. 3 are hinged at the reinforcement guide ledge 8 on both side of the chute 2. The airbag assembly is shown in a deployed condition in FIG. 3. The reinforcement ledge 8 may contain stiffening ramps 5 which are located at the inner side of the reinforcement ledge as shown in FIG. 4. The stiffening ramps 5 can further guide the airbag during deployment by directing the airbag away from the side of the chute towards the center of the doors.

The doors 3, ledge 8 and chute 2 may be integrated as an insert 6 provided in the instrument panel 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A passenger airbag assembly, comprising:

an instrument panel;

a plastic molded insert located in the instrument panel, the insert having a guide chute on an underside, and an airbag system mounted to the guide chute, wherein the insert has at least two doors defining a deployment area of a cushion of the airbag system, each of the doors having an insert molded steel piece to absorb forces of the deploying cushion, wherein the steel pieces have slots arranged apart from one another, and wherein each of the doors include a hinge at a side of the deployment area, each of the hinges being separated, at least in areas, from the instrument panel by a respective reinforcement ledge which spans across the top of the chute.

2. The passenger airbag assembly according to claim 1, wherein on an underside of the reinforcement ledge, guide ramps are provided for reinforcing the ledges and guiding the deploying cushion.

3. A method of making a passenger airbag assembly comprising making the passenger airbag assembly of claim 1.

* * * * *